INVENTOR:
JACK E. BRIDGES
BY Francis W. Crotty
HIS ATTORNEY.

Nov. 6, 1956 J. E. BRIDGES 2,769,854

SUBSCRIPTION TELEVISION SYSTEM

Filed Dec. 8, 1951 4 Sheets-Sheet 2

INVENTOR:
JACK E. BRIDGES
BY Francis W. Crotty
HIS ATTORNEY.

Nov. 6, 1956 J. E. BRIDGES 2,769,854

SUBSCRIPTION TELEVISION SYSTEM

Filed Dec. 8, 1951 4 Sheets-Sheet 3

INVENTOR:
JACK E. BRIDGES
BY Francis W. Crotty
HIS ATTORNEY.

Nov. 6, 1956 J. E. BRIDGES 2,769,854

SUBSCRIPTION TELEVISION SYSTEM

Filed Dec. 8, 1951 4 Sheets-Sheet 4

INVENTOR:
JACK E. BRIDGES
BY Francis W. Crotty
HIS ATTORNEY.

United States Patent Office 2,769,854

Patented Nov. 6, 1956

2,769,854

SUBSCRIPTION TELEVISION SYSTEM

Jack E. Bridges, Chicago, Ill., assignor to Zenith Radio Corporation, a corporation of Illinois Application December 8, 1951, Serial No. 260,641

5 Claims. (Cl. 178—5.1)

Figure 1:
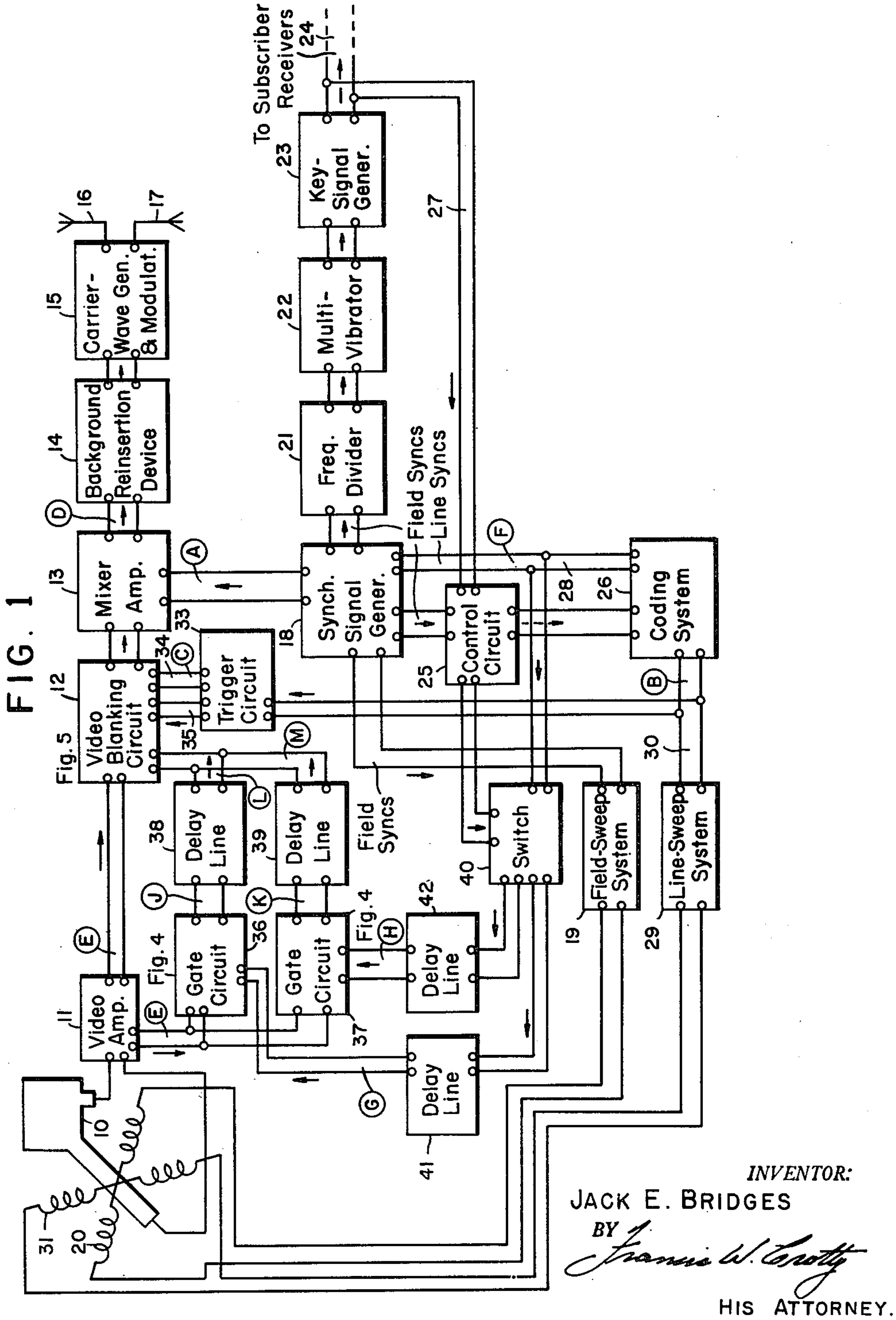

This invention relates to subscriber television systems of the type in which a television signal is coded by varying the time relation between its components at spaced intervals in accordance with a coding schedule. More specifically, the present invention is directed to a subscription television transmitter utilizing a video-signal blanking stage for introducing additional signal components into the coded television signal to prevent distortion that might otherwise arise, and provides an improved arrangement whereby unauthorized utilization of these additional components for decoding purposes is rendered extremely difficult, if not virtually impossible.

Patent 2,547,598, issued April 3, 1951, in the name of Edwin M. Roschke, entitled "Subscription, Image Transmission System and Apparatus," and assigned to the present assignee, discloses and claims a subscription television system wherein the transmitted television signal is coded by altering the relative timing of the video and synchronizing components during spaced intervals. A key signal indicating the times of occurrence of these spaced intervals is generated at the transmitter and distributed to subscriber receivers by any suitable means, for example, by means of existing telephone lines. The key signal is utilized at the various receivers to actuate decoding apparatus and enable the receivers to decode and reproduce the coded subscription television signal. It has been found that, when the coded television signal of this system is corrected at a subscriber receiver, a flicker sometimes appears in the reproduced image. This flicker has been found to be caused by an inequality of picture content in successive video fields of the television signal as the timing of the video components relative to the synchronizing components is altered in accordance with the coding schedule. Such inequality of picture content produces a low-frequency signal that usually is not translated faithfully by the various stages of the transmitter, thus producing distortion in the coded television broadcast which results in the aforementioned flicker in the image reproduced.

A system for eliminating the above-described condition is disclosed in copending application Serial No. 31,345, filed June 5, 1948, and issued March 23, 1954, as Patent 2,673,237, in the name of Pierce E. Reeves, entitled "Subscriber Transmission System," and assigned to the present assignee. The Reeves system includes a video-signal blanking stage which replaces a predetermined portion of each line trace of video signal with a pulse of a reference potential level, the position of this portion within the line-trace interval being so controlled that the picture content of successive video fields of the television signal is equalized regardless of the alterations in the relative timing of the video and synchronizing components.

In accordance with the teachings of the Reeves application, the potential level of the above-mentioned pulses is adjusted to have a value corresponding to some gray shade in the video signal. This was considered desirable since the timing of these pulses is changed in accordance with the coding schedule and, should they have an amplitude in excess of the average amplitude of the video signal, it would be possible for unauthorized receivers to utilize these pulses for decoding purposes and, therefore, reproduce the intelligence represented by the coded television signal. It has been found that under some conditions, even when the potential level of these pulses is made to correspond to some intermediate value of the video signal, it is still possible for unauthorized receivers to derive the required coding information therefrom. In order to overcome such a possibility, copending application Serial No. 187,072, filed September 27, 1950, and issued October 5, 1954, as Patent 2,691,060, in the name of Erwin M. Roschke, entitled "Subscription Television Transmitter," and assigned to the present assignee, discloses a system in which a random noise signal is superimposed on the pulses to provide a composite signal. However, due to the fact that the frequency spectrum of a random noise signal differs from that of the video signal, it may still be possible for an unauthorized person to compare the frequency characteristics of the random signal with those of the adjacent portion of the video signal to discover the coding schedule. The present invention provides a system in which the signal superimposed on the aforesaid pulses has frequency characteristics similar to the adjacent portion of the video-frequency components to preclude determination of the coding schedule of the television signal from a comparison of these two signals.

It is, accordingly, an object of the invention to provide an improved subscription television transmitter for transmitting a coded television signal which includes additional signal components for eliminating distortion that might otherwise arise and of such composition that this utilization for unauthorized decoding of the television signal is prevented for all practical purposes.

A further object of the invention is to provide such an improved subscription television transmitter in which the additional components have a wave-form so related to the video components of the coded television signal that separation of these components for unauthorized decoding purposes is rendered virtually impossible.

The subscription television transmitter of the invention comprises a video-signal generating device with an associated scanning system for controlling the device to develop during recurrent line-trace intervals video-frequency components representing a scanned subject, the scanning system including a synchronizing-signal generator for developing synchronizing components during each of recurrent retrace intervals interposed between the line-trace intervals. A coding device is coupled to the video-signal generating device for varying the operation of the transmitter from a first to a second mode to alter the time relation of the video-frequency components with respect to the synchronizing components in accordance with a coding schedule. A mixer circuit is coupled to the video-signal generating device and to the scanning system for producing a television signal which includes in alternation the video-frequency components and the synchronizing components. A blanking circuit is coupled to the video-signal generating device for suppressing the video-frequency components, and means is coupled thereto for actuating the blanking circuit during a selected portion of each of the line-trace intervals to equalize the video content represented by the video-frequency components during the line-trace intervals irrespective of the time relation of the video-frequency components and the synchronizing components. A network is provided for introducing a predetermined signal burst into the television signal during the selected portion of each of the line-trace intervals. At least one sampling circuit is coupled to the video-signal generating device for selecting a portion of the video-frequency components during each of the line-trace intervals, and means is provided for coupling the sampling circuit to the network for superimposing the selected portions of the video-frequency components on the aforesaid signal level.

The features of this invention which are believed to be new are set forth with particularity in the appended claims. The invention itself, however, together with further objects and advantages thereof may best be understood by reference to the following description when taken in conjunction with the accompanying drawings, in which:

Figure 1 represents a subscription television transmitter constructed in accordance with one embodiment of the invention.

Figure 2:
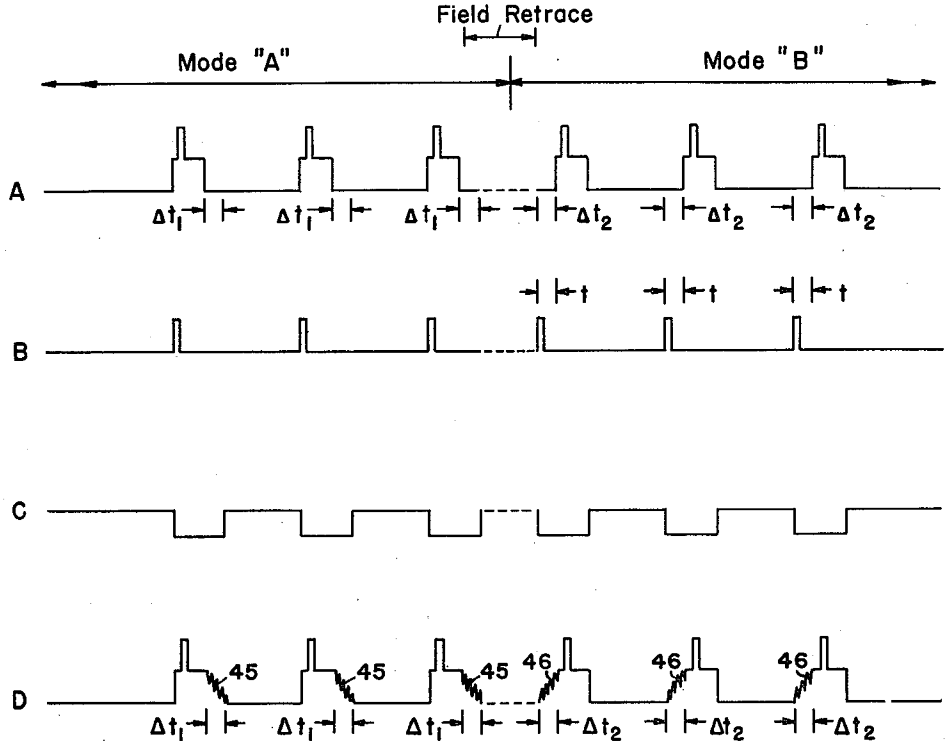
Figure 3:
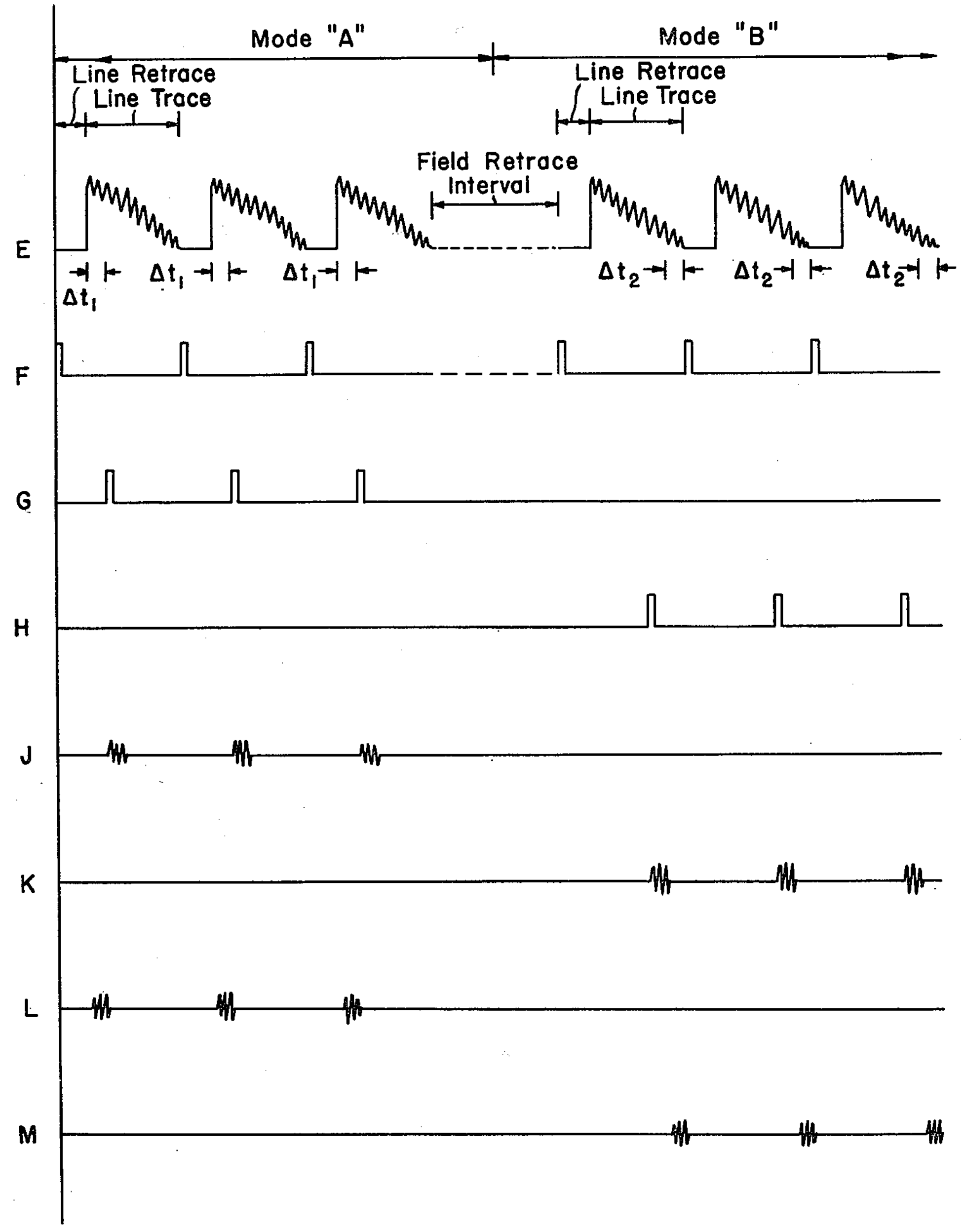
Figure 4:
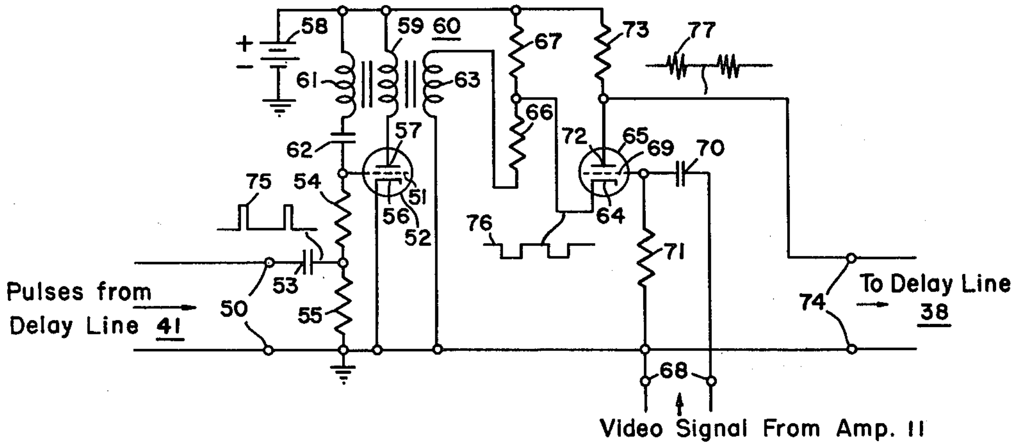
Figure 5:
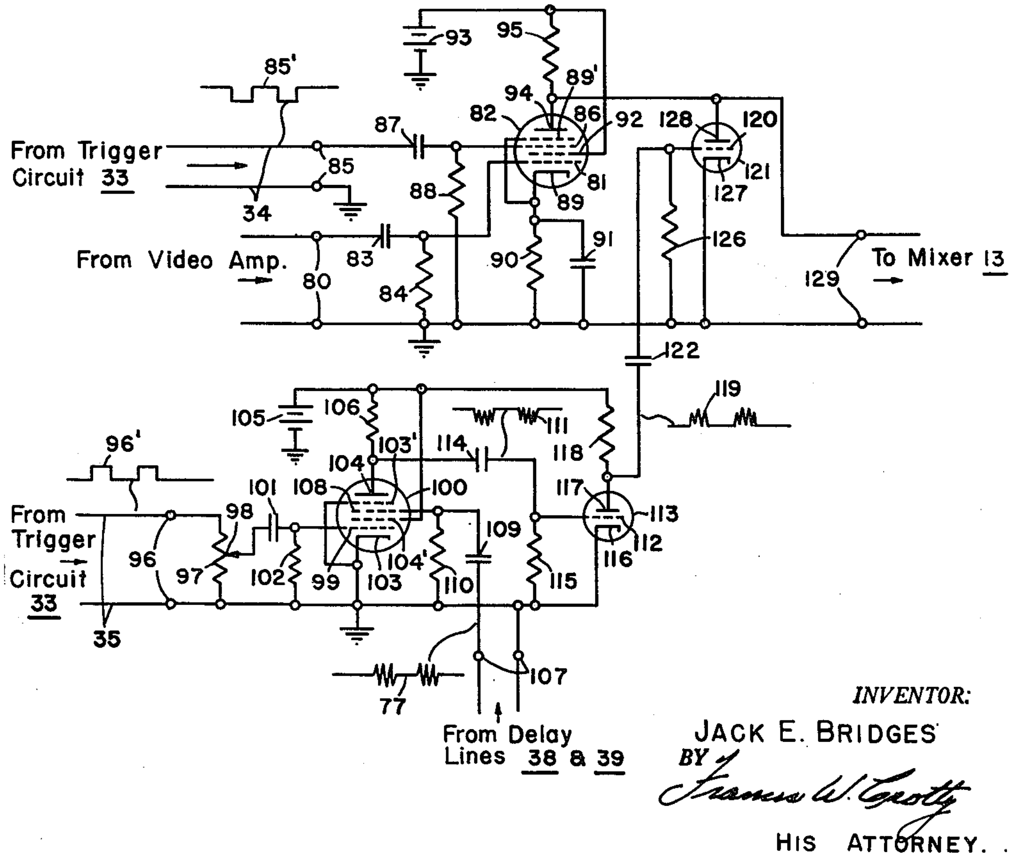

Figures 2 and 3 comprise various curves employed in explaining the operation of the transmitter of Figure 1, and, Figures 4 and 5 are detailed representations of two of the components of the transmitter.

The television transmitter of Figure 1 includes a video-frequency generating device or camera tube 10 of any well-known type connected to a video amplifier 11 of any desired number of stages. The video amplifier has output terminals connected to a video-blanking circuit 12 constructed in a manner to be described in detail hereinafter. The output terminals of unit 12 are connected to a mixer amplifier 13 which, in turn, is connected to a background or D. C. reinserter 14. The latter circuit is connected to a carrier-wave generator and modulator 15 which may be coupled to a suitable antenna circuit 16, 17. The transmitting system further includes a synchronizing-signal and blanking-pedestal generator 18 connected to mixer amplifier 13 to supply line- and field-synchronizing and pedestal pulses thereto. Unit 18 is also connected to a field sweep system 19 and supplies field-synchronizing pulses to this system, sweep system 19 being coupled to field-deflection elements 20 associated with device 10. Unit 18 is also connected to a frequency divider 21 and supplies field-synchronizing pulses to this divider which is preferably of the random type disclosed in copending application Serial No. 32,457, filed June 11, 1948, and issued March 11, 1952, as Patent 2,588,413, in the name of Erwin M. Roschke, entitled "Random Frequency Divider" and assigned to the present assignee. The output terminals of frequency divider 21 are connected to a multivibrator 22 which, in turn, is connected to a key-signal generator 23 having output terminals coupled to a line circuit 24 extending to the various subscriber receivers. Multivibrator 22 is preferably of the "Eccles-Jordan" type, that is, it has two stable operating conditions and is triggered between these conditions by successive pulses of like polarity from frequency divider 21. The multivibrator controls the key-signal generator so that a burst of key signal appears on the line circuit 24 whenever the multivibrator is in a selected one of its two operating conditions.

Unit 18 is also connected to a control circuit 25 and supplies field-synchronizing pulses thereto, the control circuit being connected to a coding system 26 and to the output terminals of key-signal generator 23 by leads 27. Unit 18 supplies line-synchronizing pulses to coding system 26 by way of leads 28. The output terminals of the coding system are connected to a line-sweep system 29 by means of leads 30, and the output terminals of sweep system 29 are connected to the line-deflection elements 31 associated with device 10. The leads 30 are also connected to the input terminals of a trigger circuit 33 having output terminals connected to video-signal blanking stage 12 by way of leads 34 and 35. Trigger circuit 33, in a manner to be described, impresses an actuating signal on blanking circuit 12, the actuating signal being impressed thereon with one polarity over leads 34 and with opposite polarity over leads 35.

Video amplifier 11 is also connected to a pair of gate circuits 36 and 37 which are coupled to video blanking circuit 12 through delay lines 38 and 39, respectively. Control circuit 25 is further connected to an electronic switch 40, having input terminals connected to generator 18 to derive line-synchronizing pulses and having output terminals connected to the aforementioned gate circuits through other delay lines 41 and 42 respectively.

Device 10 generates video-frequency components representing a subject scanned thereby, and these components are amplified in video amplifier 11, translated through a blanking stage 12 and mixed with synchronizing and pedestal pulses from unit 18 in mixer amplifier 13. The resulting composite television signal is adjusted as to background level in device 14 and is modulated on a suitable carrier wave in unit 15 for radiation from antenna 16, 17. Field-synchronizing pulses from unit 18 are applied to field-sweep system 19 to control the field scansion of device 10, and line-synchronizing pulses from unit 18 are supplied to line-sweep system 29 by way of coding system 26 to control the line scansion of this device.

Field-synchronizing pulses from unit 18 are also impressed on frequency divider 21 which effects a random frequency division of these pulses, the resulting frequency-divided pulses being used to trigger multivibrator 22. The multivibrator controls key-signal generator 23 so that a burst of key signal appears on line circuit 24 during spaced intervals when the multivibrator is in a selected one of its two stable operating conditions. In this manner, a burst of key signal is generated on line circuit 24 during spaced operating intervals which occur preferably at random times and each burst of key signal is initiated and terminated by frequency-divided field-synchronizing pulses and, therefore, during field-retrace intervals of the system.

The bursts of key signal from generator 23 are also impressed on control circuit 25 over leads 27. The control circuit is constructed so that it is actuated from one operating condition to another by the field-synchronizing pulse succeeding the initiation of each key-signal burst and is returned to the first operating condition by the field-synchronizing pulse succeeding the termination of each such burst. This actuation of the control circuit develops control pulses which are impressed on coding system 26, causing that system to alter (specifically to advance) the timing of the line-synchronizing pulses translated therethrough by a preselected amount in response to and throughout the duration of each control pulse. Accordingly, the timing of the line scansion of device 10 is altered a corresponding amount during spaced intervals represented by the control pulses and this effects an alteration in the timing of the video signal generated by this device relative to the line-synchronizing pulses generated by unit 18. In this manner, the television signal radiated by antenna 16, 17 is coded and uncompensated television receivers are unable to reproduce the intelligence represented thereby since such receivers require an invariable time relation of video to synchronizing information to synthesize an intelligible image.

The control pulses supplied to coding system 26 from control circuit 25 are initiated and terminated by field-synchronizing pulses and, therefore, during field-retrace intervals so that the timing changes of the line-synchronizing pulses impressed on line-sweep generator 29 also occur during field-retrace intervals. This precludes distortion in the image reproduced in subscriber receivers that might occur should such timing changes take place during field-trace intervals. Moreover, since each key-signal burst is initiated and terminated by field-synchronizing pulses preceding the control pulses from control circuit 25, slight delays of the key signal that might be introduced in the line circuit may be tolerated with no adverse effect on the proper operation of the system.

The components of the transmitter thus far referred to, with the exception of units 12, 25, 26, 36 and 37 are well known to the art and a further description thereof is deemed to be unnecessary. The construction of units 12, 36 and 37 is to be described fully herein, and the details of control circuit 25 and coding system 26 are fully disclosed in the aforementioned Roschke Patent 2,547,598. Since the present invention is not concerned with circuits 25 and 26, per se, it is believed unnecessary to include a further description thereof.

Reference is now made to the curves of Figures 2 and 3 for a more complete explanation of the aforementioned distortion that may arise, how such distortion may be eliminated by the introduction of additional components into the coded television signal, and how the improved arrangement of this invention controls the composition of these additional components to maintain secrecy of the television signal. Curve A represents the line-synchronizing pulses superposed on suitable pedestals and supplied to mixer amplifier 13 from generator 18. The "jittered" line-synchronizing pulses, that is to say pulses with a changing time relation, derived from coding system 26 are shown in surve B. During one mode of operation of the transmitter, designated mode "A," line or horizontal drive pulses are derived from coding system 26 with no change in timing and occur as in the usual operation of television transmitters with their leading edges in time coincidence with the leading edges of corresponding pedestal pulses of curve A. However, during the second mode of operation, designated mode "B" the drive pulses derived from coding system 26 are advanced a time interval "$t$" relative to the drive pulses derived during mode "A." As previously described, the mode "B" operation of the system is established during the spaced intervals when control circuit 25 applies a control pulse to coding system 26.

During mode "B" operation, since the line-synchronizing or drive pulses applied to line-sweep system 29 are advanced an interval "$t$" by coding system 26, the line scansion of device 10 is advanced a corresponding amount. This advances the timing of the video signal generated by device 10 relative to the line-synchronizing and pedestal components applied to mixer 13. Such timing changes in the video signal relative to the synchronizing components of the radiated composite television signal provide effective coding of the television broadcast. However, it may be shown that there is a resulting picture or video unbalance in the composite signal derived from mixer 13.

Specifically, at the start of each line trace during mode "A" operation there in a portion of the video components occurring in the short interval $\Delta t_1$ which does not appear during mode "B" operation since the advance of the video components relative to the blanking pedestals in the latter mode causes this portion to fall within the interval of the immediately adjacent preceding pedestal. Additionally, there is a similar video portion occurring in the interval $\Delta t_2$ at the end of each line trace during mode "B" operation which does not appear in mode "A" operation since in the latter this portion, likewise, falls within the immediately adjacent but succeeding pedestal. As a consequence, there is an unbalance of picture content as the timing of the video components changes relative to the synchronizing and pedestal components of the radiated signal in accordance with the coding schedule which determines the shift in modes of operation. Under some conditions this unbalance may cause distortion in the image reproduced by subscriber receivers due to the limitation of various stages of the transmitter. The purpose of stages 12 and 33 is to suppress those portions of the video-frequency components which appear in one mode but not in the other. As disclosed in the afore-mentioned Reeves application, the suppressed portions may be superseded by pulse components having a selected amplitude corresponding preferably to the average or "gray" value of the video components, and having a timing that is varied concurrently with the timing variation of the video components. In accordance with the present invention, the superseding components are constituted so as to preclude unauthorized comparison thereof with the video components to obtain the coding schedule of the television signal.

The jittered line-synchronizing pulses from coding system 26 are applied as actuating pulses to trigger circuit 33 to produce the pulses shown in curve C. Trigger circuit 33 may comprise a single-shot multivibrator constructed in a manner well known to the art and, preferably, containing a width control for adjusting the width or duration of the output pulse obtained each time the multivibrator is triggered. These output pulses are applied to video blanking circuit 12 which is so adjusted that the signal derived from mixer amplifier 13, as shown in curve D, includes additional components 45 during mode "A" operation and components 46 during mode "B" operation, these components preferably having peak amplitudes extending to the maximum amplitude or "black" value of the video signal.

Each component 45 overlaps a line-synchronizing pedestal pulse, extending beyond the trailing edge of the corresponding pedestal pulse by an amount determined by the trailing edge of each of the pulses of curve C. Preferably, the width adjustment of trigger circuit 33 is so set that the projecting portion of each component 45 fills the intervals $\Delta t_1$ to blank out any signal that might otherwise appear in such intervals. Similarly, each component 46 of mode "B" intervals overlaps and projects beyond the leading edge of an associated line pedestal pulse to suppress video information that might appear in the intervals $\Delta t_2$. Consequently, the effect of the components 45, 46 is that no video signal appears in one mode that does not occur in the other, and distortion that sometimes occurs in subscription television signals due to the inequality of picture content is eliminated.

As previously stated, components 45 and 46 are made up of pulses with a superimposed signal similar to the adjacent portion of the video-frequency components. To that end, a sampling circuit comprising units 36—42 is included in the transmitter. This sampling circuit selects, during mode "A" operation, a portion of the video-frequnecy components immediately following each component 45 and delays the selected portion a time interval corresponding to substantially a line-trace interval so that in each instance this delayed portion appears superimposed on a next succeeding component 45. Likewise, during mode "B" operation, the sampling circuit selects a portion of the video-frequency components immediately preceding each blanking component 46 and delays the selected portion an appropriate amount so that in each instance it appears superimposed on the adjacent component 46.

In this manner, components 45 and 46 are so constituted that their frequency characteristics are similar to the adjacent video-frequency components so that comparison of these components fails to reveal the coding schedule of the television signal. It is, of course, within the scope of the present invention to employ any selected portions of the video-frequency components for superpositioning on components 45 and 46. However, a closer identity between these components 45, 46 and the video-frequency components is achieved when adjacent portions of the video are used as described above.

Curve E of Figure 3 shows the video-frequency components developed by device 10 as amplified in video amplifier 11, the video components occurring in successive fields each comprising a series of line-trace intervals separated by a corresponding series of line-retrace intervals. The line-synchronizing pulses developed by generator 18 and applied to switch 40 are shown in curve F. This switch, under the control of circuit 25, passes the line-synchronizing pulses to delay line 41 during intervals of mode "A" operation and to delay line 42 during intervals of mode "B" operation. The delayed line-synchronizing pulses obtained from line 41 and impressed on gate circuit 36 are shown in curve G, whereas the pulses from delay line 42, which are supplied to gate circuit 37, are shown in curve H.

The pulses from line 41, shown in curve G, occur immediately after the video intervals $\Delta t_1$ of mode "A" operation, whereas the pulses from line 42, as shown in curve H, occur just prior to the video intervals $\Delta t_2$ of mode "B" operation. During mode "A" operation, the pulses from line 41 actuate gate circuit 36 to select a portion of the video-frequency components occurring in each line-trace interval just after the interval $\Delta t_1$ as shown in curve J. The selected portion is delayed by line 38 so that in each instance it occurs in the next succeeding interval $\Delta t_1$. On the other hand, during mode "B" operation, the pulses from line 42 actuate gate circuit 37 to select a portion of the video-frequency components occurring in each line-trace interval just prior to the interval $\Delta t_2$, as shown in curve K. The latter selected portion is delayed by line 39 so that in each instance it occurs in the next succeeding interval $\Delta t_2$. This action of the sampling circuit causes the selected portions of the video-frequency components to coincide in time with the pulses of curve 2C during mode "A" and mode "B" operation. Therefore, the composite signal components 45 are constituted by pulses with adjacent video-frequency components pedestalled thereon, and the components 46 are similarly constituted. It is necessary to correlate the position of the video components selected to the intervals $\Delta t_1$ and $\Delta t_2$. This is accomplished within the gating circuits as presently to be described.

The details of gate circuit 36 are illustrated in Figure 4 and it will be understood that gate 37 may have a similar construction. As indicated, the gate circuit includes a pair of input terminals 50 to which delay line 41 is coupled, one terminal 50 being grounded and the other being coupled to the control electrode 51 of an electron-discharge device 52 through a capacitor 53 and limiting resistor 54. The junction of capacitor 53 and resistor 54 is connected to ground through a grid-leak resistor 55. Device 52 is included in a blocking oscillator circuit. Its cathode 56 is connected to ground and its anode 57 connects to the positive terminal of a source of unidirectional potential 58 through a winding 59 of transformer 60. A second winding 61 of the transformer is connected in series with winding 59 and with a condenser 62 to control electrode 51 of tube 52. The transformer has a third winding 63 having one terminal grounded and another terminal connected to the cathode 64 of an electron-discharge device 65 through a resistor 66, the junction of cathode 64 and resistor 66 being connected to the positive terminal of source 58 through a resistor 67. The gate circuit has a further pair of input terminals 68 to which video amplifier 11 is coupled; one of the terminals 68 is grounded and the other is coupled to the control electrode 69 of device 65 through a coupling capacitor 70. Control electrode 69 is connected to ground through a grid-leak resistor 71 and the anode 72 of device 65 is connected to the positive terminal of source 58 through a load resistor 73. The gate circuit has output terminals 74 connected to delay line 38, one of the output terminals being grounded and the other being connected to anode 72.

Gating pulses 75 from delay line 41 are impressed on control electrode 51 and trigger the blocking oscillator comprising device 52 causing it to impress on the cathode 64 of device 65 a signal 76 having negative pulse components each with a time duration determined by the parameters of the oscillator. Due to the forced bias on cathode 64 through resistor 67, device 65 normally is in a non-conductive state, and the video signal applied to terminals 68 does not reach output terminals 74. However, the negative pulse components of signal 76 unblock device 65, and portions 77 of the video signal reach the output terminals. As previously described, and shown in curve J of Figure 3, the pulses from delay line 41 have such a timing that the bursts 77 at the output terminals represent a portion of the video signal occurring in each line trace immediately after the interval $\Delta t_1$. These bursts are then applied to delay line 38 to be delayed an appropriate amount for pedestalling on the pulse portion of the composite components 45 of curve 2D. The parameters of the blocking oscillator are chosen to provide the duration for pulses 76 necessary to have the delayed video portion fill in the time intervals $\Delta t_1$, or $\Delta t_2$ in the case of gate circuit 37.

A detailed diagram of blanking circuit 12 is shown in Figure 5. This circuit includes a pair of input terminals 80 connected to video amplifier 11. One of terminals 80 is grounded and the other is connected to a control electrode 81 of an electron-discharge device 82 through a coupling capacitor 83, the control electrode being connected to ground through a grid resistor 84. The blanking circuit includes a second pair of input terminals 85 connected to trigger circuit 33 by leads 34 to derive therefrom negative-polarity pulses 85′ such as shown in curve 2C. One of terminals 85 is grounded and the other is coupled to a second control electrode 86 of device 82 through a coupling capacitor 87, electrode 86 being connected to ground through a grid-leak resistor 88. The cathode 89 of device 82 is connected to ground through a resistor 90 shunted by a by-pass capacitor 91 and the suppressor electrode 89′ is connected to the cathode. The screen-grid 92 is connected to the positive terminal of a source of unidirectional potential 93, and the anode 94 is connected to this terminal through a load resistor 95.

The blanking circuit includes a third pair of input terminals 96 connected to trigger circuit 33 by leads 35 to derive therefrom positive pulses 96′ occurring in time coincidence with pulses 85′. One of the terminals 96 is connected to ground and to one side of a potentiometer 97, and the other terminal is connected to the other side of this potentiometer. Potentiometer 97 has an adjustable tap 98 coupled to a control electrode 99 of an electron-discharge device 100 through a coupling capacitor 101, the control electrode being connected to ground through a grid-leak resistor 102. The cathode 103 of device 100 is directly grounded and the anode 104 is connected to the positive terminal of a unidirectional potential source 105 through a load resistor 106. The suppressor electrode 103′ is connected to the cathode, and the screen electrode 104′ is connected to the positive terminal of source 105. The blanking stage has still further input terminals 107 connected to delay lines 38 and 39 to derive therefrom the selected video-frequency components 77 such as shown in curves 3L and 3M. One of the terminals 107 is grounded and the other is coupled to a control electrode 108 of device 100 through a coupling capacitor 109, the control electrode being connected to ground through a grid-leak resistor 110.

Electron-discharge device 100 is employed as a mixer to produce a signal 111 in its output circuit in response to the positive polarity pulses 96′ applied to control electrode 99 and to the video-frequency components 77 applied to control electrode 108. As previously pointed out, the sampling circuits are so constructed that components 77 occur in time coincidence with pulses from trigger circuit 33 both during mode "A" and during mode "B" operation. Therefore, these components combine with the pulses 96′ to produce the signal 111 in the output circuit of device 100.

The anode 104 of device 100 is coupled to the control electrode 112 of an electron-discharge device 113 through a coupling capacitor 114, the control electrode being connected to ground through a grid-leak resistor 115. Cathode 116 of device 113 is connected to ground and anode 117 is connected to the positive terminal of source 105 through a load resistor 118. Device or tube 113 is a phase inverter and a signal 119 is produced in its output circuit in response to the signal 111 applied to control electrode 112.

Anode 117 of device 113 is coupled to the control electrode 120 of an electron-discharge device 121 through a coupling capacitor 122, the control electrode being connected to ground through a grid-leak resistor 126. The cathode 127 of device 121 is directly grounded, and the anode 128 is directly connected to anode 94 of device 82. Anode 94 and 128 are connected to one of the output terminals 129 of the blanking circuit, the other output terminal being connected to ground. These output terminals are connected to mixer amplifier 13 of Figure 1.

The blanking circuit of Figure 5 is so constructed that during the intervals between the negative pulse components of signal 85′, produced by trigger circuit 33, device 82 is conductive and device 121 is non-conductive. During these intervals the video-frequency components from video amplifier 11 applied across input terminals 80 are amplified in device 82 and appear across output terminals 129 for application to mixer amplifier 13. For the duration of each negative polarity pulse impressed on input terminals 85 from trigger circuit 33 device 82 is rendered non-conductive to the video signal and the signal level represented by its anode potential for each pulse interval is a fixed shade value corresponding to the maximum or "black" value of the video signal. Accordingly, the signal potential at output terminals 129 due solely to the presence of the negative pulse on control electrode 86 has a certain preselected level independent of the instantaneous value of the video signal on control electrode 81. In this manner, a selected signal level is introduced into the video components for the duration of each pulse applied to terminals 85.

As previously described, it is desirable that the additional signal components introduced into the radiated television signal have no fixed reference level in order to prevent unauthorized synchronization thereon. This is accomplished by the circuit of device 121 which may be considered a control network which receives a control pulse of positive polarity and adjustable amplitude during the blanking-pulse interval. This control pulse has selected video-frequency components impressed thereon as indicated by the wave form 119 and appears with negative polarity in the common output circuit of devices 82 and 121 where it is superposed on the aforedescribed selected signal level. Adjustment of tap 98 controls the amplitude of the resultant composite components introduced into the video-frequency components appearing at output terminals 129. Preferably, the tap adjustment is such that the composite components have a peak amplitude corresponding to black shade value of the video-frequency components.

Accordingly, with the blanking circuit of Figure 5 interposed between video amplifier 11 and mixer amplifier 13 of Figure 1 and actuated by trigger circuit 33, selected portions of each line-trace interval of the video-frequency components may be suppressed and replaced by composite components of a particular composition. Since the jittered synchronizing pulses of curve B of Figure 2 control the timing of trigger circuit 33 and vary its timing with changes in operating mode of the transmitter, the suppressed portions of the video line-trace intervals are altered to maintain an equality of picture content in successive fields regardless of the mode of operation.

This invention provides, therefore, an improved subscription television transmitter for transmitting a coded television signal including additional signal components which are controlled to equalize the picture content regardless of mode of operation of the system, the additional components having characteristics similar to the video components of the television signal to preclude a comparison between these components for unauthorized decoding purposes.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A subscription television transmitter comprising: a source of video signals representing image intelligence during recurrent line-trace intervals; a source of synchronizing signals during recurrent retrace intervals interposed between said trace intervals; coding means coupled to at least one of said sources for altering the time relation between said video and synchronizing signals in accordance with a predetermined coding schedule; a mixer circuit, coupled to said sources, for producing a television signal including said video and synchronizing signals; a blanking circuit responsive to an applied signal for suppressing said video signals; means, comprising means for supplying a signal to said blanking circuit during a selected portion of each of said line-trace intervals to effect actuation of said blanking circuit, for equalizing the video content represented by said video signals during said line-trace intervals irrespective of the time relation between said video and synchronizing signals; means for establishing said television signal at a predetermined signal level during said selected portion of each of said line-trace intervals; at least one sampling circuit for selecting a portion of said video signals during each of said line-trace intervals; and means, comprising means coupled between said sampling circuit and said signal level establishing means, for superimposing said selected portions of said video signals on said signal level.

2. A subscription television transmitter comprising: a source of video signals representing image intelligence during recurrent line-trace intervals; a source of synchronizing signals during recurrent retrace intervals interposed between said trace intervals; coding means coupled to at least one of said sources for altering the time relation between said video and synchronizing signals in accordance with a predetermined coding schedule; a mixer circuit, coupled to said sources, for producing a television signal including said video and synchronizing signals; a blanking circuit responsive to an applied signal for suppressing said video signals; means, comprising means for supplying a signal to said blanking circuit during a selected portion of each of said line-trace intervals to effect actuation of said blanking circuit, for equalizing the video content represented by said video signals during said line-trace intervals irrespective of the time relation between said video and synchronizing signals; means for establishing said television signal at a predetermined signal level during said selected portion of each of said line-trace intervals; a sampling circuit for selecting a portion of said video signals during each of said line-trace intervals; and means, including a delay line coupled between said sampling circuit and said signal level establishing means, for imparting a preselected time delay to said selected portions of said video signals and for superimposing said delayed portions on said signal level.

3. A subscription television transmitter comprising: a source of video signals representing image intelligence during recurrent line-trace intervals; a source of synchronizing signals during recurrent retrace intervals interposed between said trace intervals; coding means coupled to at least one of said sources for varying the operation of said transmitter between a first and a second mode to alter the time relation between said video and synchronizing signals in accordance with a predetermined coding schedule; a mixer circuit, coupled to said sources, for producing a television signal including said video and synchronizing signals; a blanking circuit responsive to an applied signal for suppressing said video signals; means, comprising means for supplying a signal to said blanking circuit during a selected portion of each of said line-trace intervals to effect actuation of said blanking circuit, for equalizing the video content represented by said video signals during said line-trace intervals irrespective of the time relation between said video and synchronizing signals; means for establishing said television signal at a predetermined signal level during said selected portion of each of said line-trace intervals; a sampling circuit coupled to said video source; a control circuit for actuating said sampling circuit to select a first portion of said video signals during each of said line-trace intervals during the first operating mode of the transmitter and to select a second portion of said video signals during each of said line-trace intervals during the second operating mode; and means, comprising means coupled between said sampling circuit and said signal level establishing means, for superimposing said selected portions of said video signals on said signal level.

4. A subscription television transmitter comprising: a source of video signals representing image intelligence during recurrent line-trace intervals; a source of synchronizing signals during recurrent retrace intervals interposed between said trace intervals; coding means coupled to at least one of said sources for varying the operation of said transmitter between a first and a second mode to alter the time relation between said video and synchronizing signals in accordance with a predetermined coding schedule; a mixer circuit, coupled to said sources, for producing a television signal including said video and synchronizing signals; a blanking circuit responsive to an applied signal for suppressing said video signals; means, comprising means for supplying a signal to said blanking circuit during a selected portion of each of said line-trace intervals to effect actuation of said blanking circuit, for equalizing the video content represented by said video signals during said line-trace intervals irrespective of the time relation between said video and synchronizing signals; means for establishing said television signal at a predetermined signal level during said selected portion of each of said line-trace intervals; a first sampling circuit coupled to said video source for selecting a predetermined portion of said video signals during each of said line-trace intervals; a second sampling circuit coupled to said video source for selecting a different portion of said video signals during each of said line-trace intervals; a control circuit coupled to said coding means for actuating said first sampling circuit during the first operating mode of said transmitter, and for actuating said second sampling circuit during the second operating mode of said transmitter; and means, comprising means coupled between said sampling circuits and said signal level establishing means, for superimposing said selected portions of said video signals on said signal level.

5. A subscription television transmitter comprising: a source of video signals representing image intelligence during recurrent line-trace intervals; a source of synchronizing signals during recurrent retrace intervals interposed between said trace intervals; coding means coupled to at least one of said sources for varying the operation of said transmitter between a first and a second mode to alter the time relation between said video and synchronizing signals in accordance with a predetermined coding schedule; a mixer circuit, coupled to said sources, for producing a television signal including said video and synchronizing signals; a blanking circuit responsive to an applied signal for suppressing said video signals; means, comprising means for supplying a signal to said blanking circuit during a selected portion of each of said line-trace intervals to effect actuation of said blanking circuit, for equalizing the video content represented by said video signals during said line-trace intervals irrespective of the time relation between said video and synchronizing signals; means for establishing said television signal at a predetermined signal level during said selected portion of each of said line-trace intervals; at least one sampling circuit for selecting a portion of said video signals during each of said line-trace intervals; and means, including a first delay line coupled between said first sampling circuit and said signal level establishing means and a second delay line coupled between said second sampling circuit and said signal level establishing means, for imparting preselected time relays to said selected portions of said video signals and for superimposing said delayed portions on said signal level.

References Cited in the file of this patent

UNITED STATES PATENTS

| | | |
|---|---|---|
| 2,570,188 | Aram et al. | Oct. 9, 1951 |
| 2,572,853 | Gary | Oct. 30, 1951 |